Dec. 22, 1970 V. J. GUARINO 3,548,656
FLOW METER
Filed Feb. 5, 1968 3 Sheets-Sheet 1

Inventor
Victor J. Guarino
By Hofgren, Wegner,
Allen, Stellman & McCord
Attys

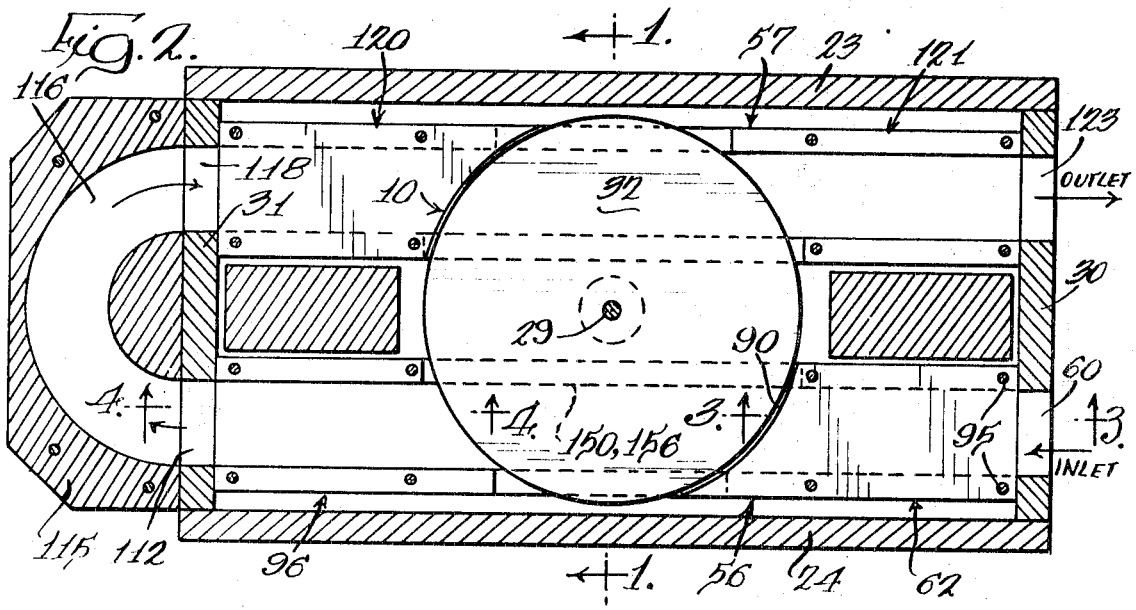
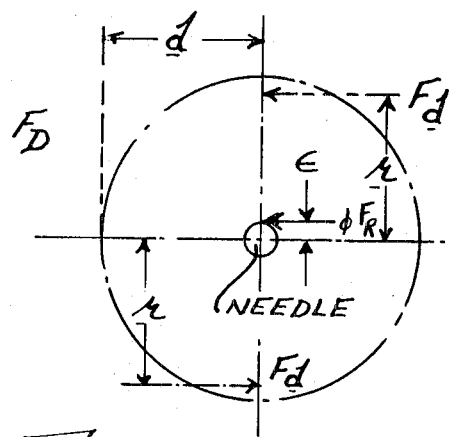
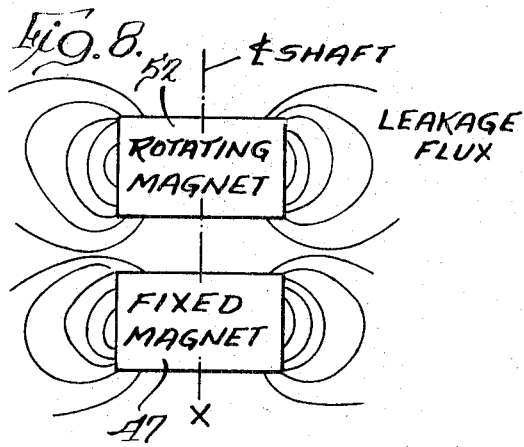
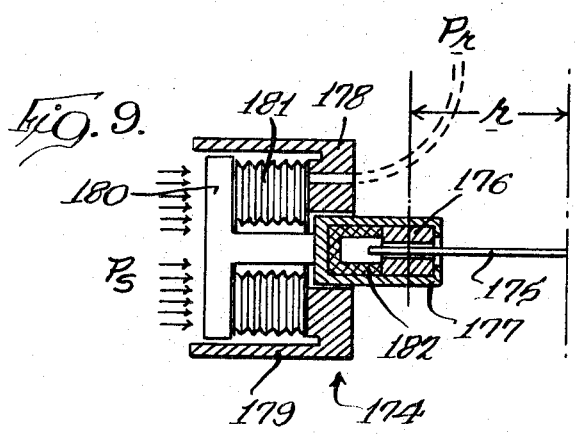

Dec. 22, 1970  V. J. GUARINO  3,548,656
FLOW METER
Filed Feb. 5, 1968  3 Sheets-Sheet 3

United States Patent Office 3,548,656
Patented Dec. 22, 1970

1

3,548,656
FLOW METER
Victor J. Guarino, Oak Park, Ill., assignor, by mesne assignments, to I-T-E Imperial Corporation, Philadelphia, Pa., a corporation of Delaware
Filed Feb. 5, 1968, Ser. No. 703,112
Int. Cl. G01f 1/06
U.S. Cl. 73—229                                  16 Claims

ABSTRACT OF THE DISCLOSURE

A flow meter wherein measurement is accomplished by recording the rotations of closely spaced flat discs magnetically suspended parallel to the gas stream in a rectangular flow channel so that the discs are rotated by viscous drag.

BACKGROUND OF THE INVENTION

There is a general class of flow meters that operate by directing a fluid flow stream against a rotary member to drive the member and in some manner measuring the rate of rotation or total rotations of the member to obtain the desired flow measurement readout. One type is commonly referred to as a turbine meter and this operates by passing flow against turbine blades mounted on a rotor which is supported parallel to the gas stream in a pipe of large diameter. The turbine meter is inherently a high flow rate meter since its accuracy, i.e. linearity, depends on the negligibility of the viscous effects.

Still another type of flow meter operates on a drag principle by directing flow over a shaped body and measuring, through the use of a strain gauge, the drag force. To determine total flow, however, electronic circuitry is required for integration with respect to time.

Another type of flow meter which is of the total flow measurement type is the conventional, residential gas meter which includes two leather or synthetic diaphragms which operate through alternate expansions to rotate a shaft geared to a simple mechanical counter. This diaphragm meter has the great disadvantage that it is inherently large and bulky.

Most of these prior flow meter designs have the basic disadvantages of (1) not providing good accuracy at low flow rates, (2) not providing good accuracy over a large flow range, and (3) operating at high pressure differentials and high energy consumptions.

SUMMARY OF THE INVENTION

In accordance with the present invention a flow measurement device is provided in which the angular velocity of fluid drag discs is a linear analog of the volume rate of flow of fluid through the device and hence total fluid volume may be measured by recording the rotations of the drag discs. The drag discs are flat and closely spaced, parallel to the gas stream in a rectangular flow channel. They are magnetically suspended to reduce the resistance to rotation as well as magnetically retarded to limit the angular velocity of the discs at the maximum desired flow rate. The discs are spaced such that the thin flow channels defined by the discs produce Poiseuille flow. The number of discs is selected depending upon the desired flow range of the instrument.

In the present device the angular velocity of the discs is a function of the volume rate of flow. From this the

2 angle of rotation of the discs is the integral of the flow function. If this flow function can be linearized, total gas or fluid volume may be measured directly by measuring the number of rotations made by the discs. In prior devices of this character the flow function is not linearized and therefore gas or fluid volume may not so easily be measured. The discs are magnetically supported since the frictional resistance to rotation thereof must be small because the viscosity of gas is very small. For example the viscosity of air is so small that the stress corresponding to a change of velocity of 100 m.p.h. over .01" is about 1 oz. per square foot.

The advantages of the present viscous drag flow meter over those in the prior art are the (1) basically digital character and inherently good accuracy at low flow rates and within large flow range, (2) simplicity of design since only one moving part is required, (3) smallness in physical size, (4) low cost, (5) ease of converting from flow rate measurement into measurement of total flow, (6) ability to measure reverse flow, (7) ability to operate at very low pressure differentials while requiring low energy consumption, (8) ability to accurately follow rapid changes in flow because of its low inertia, and (9) ability to measure in-line flow in a conduit without introducing any flow interruptions in the metered system.

BRIEF DESCRIPTION OF THE DRAWINGS

FIG. 2 is a plan view of the flow meter shown in FIG. 1;

FIG. 7 is a schematic diagram of the forces acting on the discs;

FIG. 8 is a schematic diagram of the flux pattern of the magnetic bearing supporting the discs; and FIG. 9 is a schematic diagram of a modified damping assembly which includes pressure and temperature compensation.

Figure 1:
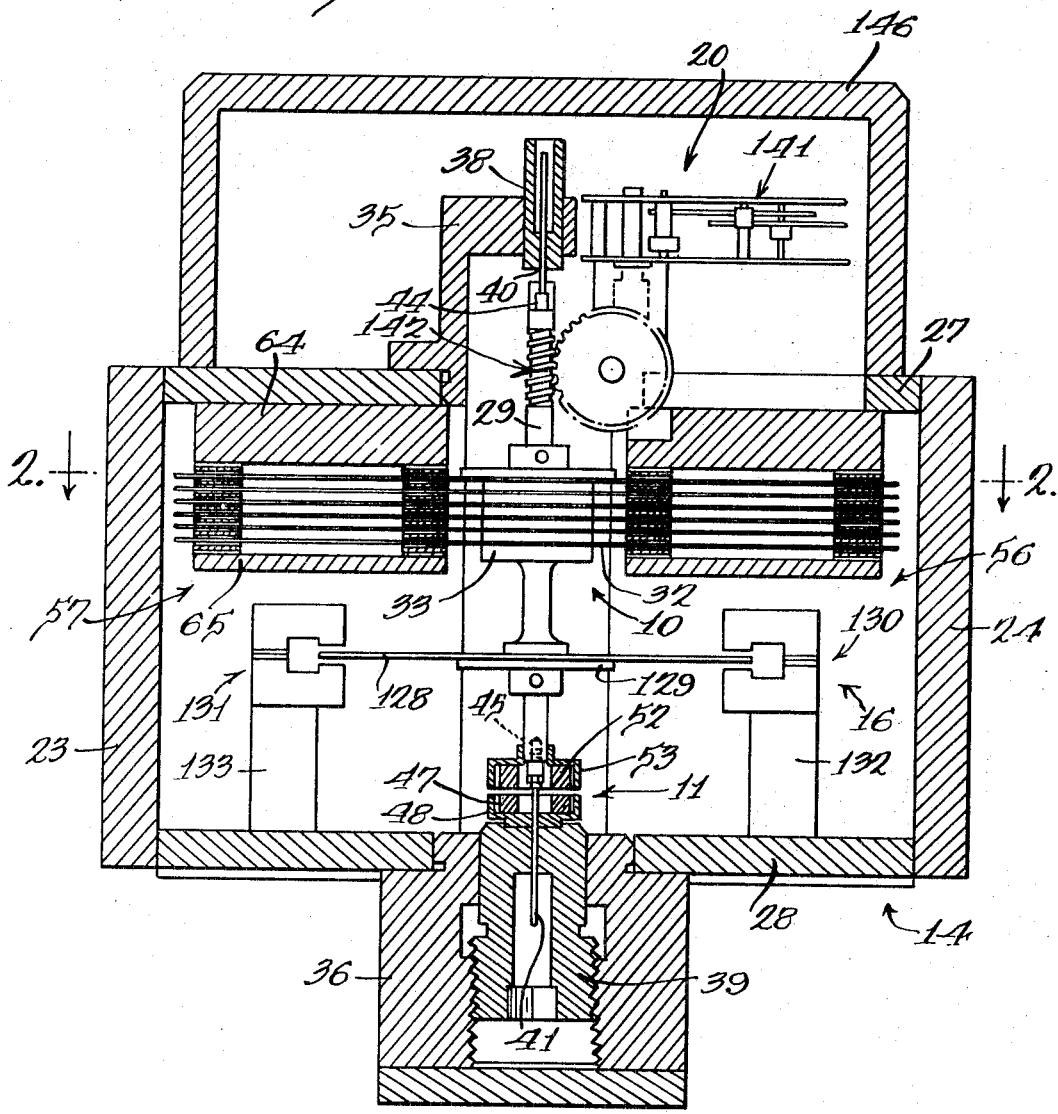
FIG. 1 is a longitudinal section of a flow meter according to the present invention.

While I have shown and shall hereinafter describe certain embodiments of the invention, it is to be understood that it is capable of many modifications. Changes, therefore, in the construction and arrangement may be made without departing from the spirit and scope of the invention as defined in the appended claims.

DETAILED DESCRIPTION OF THE PREFERRED EMBODIMENT

For a complete understanding of the present invention it is desirable to analyze the flow of a gas, such as air, moving between plane parallel surfaces so confining the flow that an all boundary layer condition occurs, i.e., the viscous stresses influence the entire flow. In the analysis of this type of flow the steady state condition will be considered and let the following assumptions apply.

1. The gas is a continuous medium.
2. The gas moves in one direction only, in the Z or stream direction.
3. The gas density and viscosity do not vary with position in the flow channel.

Then two equations completely describe the flow, the equations of motion and continuity. The equation of continuits is:

(1) $$\frac{\partial \rho}{\partial t}+\frac{\partial \rho w}{\partial x}+\frac{\partial \rho v}{\partial y}+\frac{\partial \rho w}{\partial z}=0$$

where:
$\rho$=density
$t$=time
$x$=an axial station in a direction transverse to the flow of gas
$w$=velocity of the fluid in the $x$ direction
$y$=an axial station perpendicular to the parallel surfaces
$v$=the velocity in the $y$ direction
$z$=an axial station in the direction of fluid flow
$u$=velocity in the $z$ direction
and, since $\rho$=constant, the flow is not time dependent, and since velocities $w$ and $v=0$ (2) $$\frac{\partial u}{\partial t}=0$$

The equation of motion in the stream direction is:

(3) $$\frac{\partial u}{\partial t}+\mu\frac{\partial u}{\partial z}+v\frac{\partial u}{\partial y}+w\frac{\partial u}{\partial x}=\frac{-1}{\rho}\frac{\partial P}{\partial z}+\nu\left(\frac{\partial^2 u}{\partial z^2}+\frac{\partial^2 u}{\partial y^2}+\frac{\partial^2 u}{\partial y^2}\right)$$

where:
$\nu$=kinematic viscosity
P=pressure, and the other parameters are the same as defined above, which, after the assumptions are applied, reduces to (4) $$u\frac{\partial u}{\partial z}=\frac{-1}{\rho}\frac{\partial P}{\partial z}+\nu\left(\frac{\partial^2 u}{\partial z^2}+\frac{\partial^2 u}{\partial y^2}\right)$$

and from (2), the velocity $u$ is dependent on the $y$ coordinate only, and hence (5) $$\frac{1}{\rho}\frac{\partial u}{\partial z}=\nu\frac{\partial^2 u}{\partial y^2}$$

Since $$\frac{\partial P}{\partial x}=\frac{\partial P}{\partial y}=0$$

(6) $$\frac{\partial P}{\partial z}=\text{constant}=\Delta P(z)$$

we arrive at (7) by integration of (5)

(7) $$\frac{1}{2}\Delta P(z)y^2+C_1 y+C_2=\mu u$$

where:
$C_1$ and $C_2$ are constants of integration, and
$\mu$=gas viscosity.

The gas or fluid at the wall has no relative velocity thereto so that at the wall, $y=\pm h/2$ and $\mu=0$ where:
$h$=the space between the plane parallel surfaces under consideration (noting that $y$ is an axial station from midway between the surfaces).

By inserting these boundary conditions into (7), (8) $$u=\frac{1}{2\mu}\Delta P(z)\left(y^2-\frac{h^2}{4}\right)$$

Consider now the mean velocity across a section of the channel, (9) $$u_m=\frac{\int_0^{h/2} u\,dy}{h/2}=\frac{\Delta P(z)}{\mu h}\int_0^{h/2}(y^2-h^2/4)\,dy$$

and after integration

(10) $$u_m=\frac{\Delta P(z)}{12\mu}h^2$$

Rearranging (10) and substituting the expression for $\Delta P(z)$ into (8) we find

(11) $$u(y)=\frac{3}{2}u\left(1-\frac{4y^2}{h^2}\right)$$

This equation states that the steady state velocity distribution between the plane parallel surfaces under consideration is parabolic in distribution with a maximum velocity midway between the surfaces. This flow with its characteristic velocity distribution will be recognized by those skilled in fluid mechanics as plane Poiseuille flow.

Since we now have an expression for the velocity of the fluid between the walls as a function of the distance from the wall, the following development of the shear stress with velocity changes from the wall yields an expression for the drag force on the walls produced by the gas flowing thereacross in terms of the mean velocity between the walls or, finally, the volume flow between the walls.

Toward this end the tangential stress at the surface of each wall is obtained from the Newtonian viscosity formula

(12) $$\tau yz=-\mu\frac{du}{dy}$$

where $\tau yz$ is the shear stress at any point in the fluid acting in the $z-$ direction perpendicular to the $y-$ axis. For gases and most liquids the viscosity $\mu$ is independent of the rate of shear, $du/dy$.

Substitution of the velocity distribution (11) into the viscosity formula (10) and performing the differentiation and then evaluating the shear stress at the wall location results in

(13) $$\tau_0=\frac{-6\mu u_m}{h}$$

where the negative sign indicates that the stress acting on the fluid due to the wall interface is in an opposite direction of the motion of fluid flow. Thus, the drag force is given by the positive value

(14) $$F_D=\frac{6\mu u_m S}{h}$$

where S is the shear area.
Since the volume flow is expressed by:

(15) $$q=u_m A$$

where A is the cross sectional area of a flow channel between the parallel walls. Thus, the drag force in terms of volume flow may be expressed as

(16) $$F_D=\frac{6\mu q}{h}\frac{S}{A}$$

where, as in the present device, a plurality of $n$ flow channels are provided resulting in a total shear area of $2(n-1)S$, and since $A=bh$, where $b$ is the flow channel width the total drag force becomes

(17) $$F_D=\frac{12(n-1)}{n}Q\left(\frac{S}{bh^2}\right)\mu$$

where Q is the total volume flow through $n$-channels, or in terms of the mass flow, M

(18) $$F_D=\frac{12(n-1)}{n}\dot{M}\left(\frac{S}{bh^2}\right)\frac{\mu}{\rho}$$

Thus Equation 18 describes the drag force in terms of the basic geometric parameters and fluid properties.

In the present device the derivations developed above are applied to a flow meter having a plurality of spaced discs (which represent the parallel walls described above) provided with transverse flow restrictors extending between the discs defining a plurality of $n$ narrow flow channels. The flow in each channel is thus 1/$n$th the total flow. These discs are circular and fixed together to rotate about a common axis and may be thought of as defining partitions for the channels where the distance in the $x$—$z$ plane between the flow restrictors represents the width $b$ of the channel and the distance in the $x$—$y$ plane between the discs themselves represents the depth $h$ of the channel. With the discs free to rotate upon the delivery of a fluid, such as a gas, through the channels, the angular velocity of the discs generated by the drag force $F_D$ represents a linearized function of the flow rate, and the angle of rotation of the discs is an integration of the total flow.

It is well to substantiate the assumptions made in the above derivation with respect to gas continuum and incompressibility. The gas is a continuum since the dimensions of the flow channel are large compared to the molecular mean free path of the gas, except at extremely low pressure where rarification occurs. Moreover, the density of the gas will be practically constant since the pressure gradient across the flow channel is small compared to the supply pressure of the fluid or gas. Furthermore, since the viscosity of the gas or fluid is essentially dependent on temperature only, for an isothermal passage of the fluid through the meter, the viscosity will be practically constant.

The drawings and particularly FIGS. 1 to 6 illustrate a viscous drag flow meter incorporating the fluid flow phenomena described above so that the expressions developed have validity with respect thereto at least to the extent of the assumptions indicated. As will be apparent to those skilled in the art the present device may be used with many fluids including air. An exemplary application is found in a residential gas meter. The device finds applicability in other types of flow measuring or analyzing devices.

The exemplary construction shown in the drawings is a flow meter in which the fluid is passed over the rotating discs twice. This is done for several reasons, one of which is to increase the flow range of the device.

As seen in FIGS. 1 to 6 the present flow meter is seen to include generally a rotating disc assembly 10 supported by a magnetic bearing assembly 11 in a housing assembly 14 with a retarding assembly 16 for limiting the maximum speed of the disc assembly, and a counting mechanism 20 for counting the rotations of disc assembly 10.

More particularly, the housing 14 is seen to include spaced parallel side plates 23 and 24 fixed to horizontal top and bottom plates 27 and 28 by suitable fasteners, not shown. As seen in FIG. 2 one end of the housing 14 is closed by an end plate 30 and the other end is closed by an end plate 31.

The disc assembly 10 includes a shaft 29 having a cylindrical disc support 33. Fixedly mounted on the support 33 are a plurality of circular thin flat discs 32 constructed of a light weight material such as magnesium. Since it is desirable to reduce the suspension weight, and to reduce the inertia of the rotating components of the meter to improve the meter's response to flow variations, the discs 32 may be selectively etched to reduce the weight thereof.

For rotatably supporting and suspending the disc assembly 10 a repulsion magnetic bearing is provided similar to that provided in Watt-hour meters. Toward this end, upper and lower bearing bosses 35 and 36 are provided in the top and bottom plates 27, 28 respectively. Needle supports 38 and 39 are fixedly received in the bearing bosses and have seated therein needles 40 and 41, respectively. At each end of the shaft 29 a graphite or jewel bushing (not shown) is carried at positions indicated generally at 44 and 45. The needles guide the rotation of the shaft by preventing horizontal movement thereof in the plane of FIG. 1.

Magnetic bearing 11 includes a fixed permanent magnet 47 seated within a cup 48 in turn fixed to needle support 39. Another permanent magnet 52 is carried within a rotatable cup 53 fixed to shaft 29. The magnets 47 and 52 are of the same polarity and set up a repulsion force which suspends the disc assembly 10 and shaft 29.

The only reaction force of the bearing is due to contact of the needle with the graphite or jewel bushings seated within the ends of shaft 29. It is desirable that the influence on this reaction forced ue to magnetic unbalance forces in the bearing be reduced as much as possible so that the drag force as it approaches zero with decreasing flow will be greater than the reaction force. In this regard reference may be made to FIG. 7 wherein the forces acting on the disc assembly 10 are shown schematically with $F_D$ being the drag force and $\Phi F_R$ being the reaction force of the bearing, where $\Phi$ is the coefficient of friction between the needle and bushing materials. The forces $F_D$ and $\Phi F_R$ act at distances $d$ and $e$, respectively, from the centerline of the disc assembly. In FIG. 7 the schematic is shown for the case of a single pass of the fluid over the disc; hence, in this case the drag force $F_D$ is not balanced by an equivalent $F_D$, acting 180 degrees apart, which is generated by the second pass. The viscous forces of the gas or other fluid passing over the discs are very small so that the bearing system is important. In FIG. 8 the general magnetic flux pattern of the magnets 47 and 52 is shown. It is important that the leakage flux be kept to a minimum.

For the purpose of conveying fluid flow to be metered to and from the device a first pass channel or conduit 56 and a second pass channel 57 are provided. The double pass system is preferred since it reduces the reaction force due to contact of the needles 40 and 41 with the shaft 29. Toward this end a rectangular inlet opening 60 is provided in end plate 30, adapted to be connected to a suitable fitting to a source fluid, such as air or natural gas, to be measured. From inlet opening 60 the gas travels into and through a first pass inlet or starting section 62, as seen more clearly in enlarged FIGS. 3 and 5. Inlet section 62 consists of upper and lower plates 64 and 65. It should be understood that the members 64 and 65 extend from the end plate 30 to the end plate 31.

Spacing the members 64 and 65 adjacent the inlet section 62 are stacked guide vanes 75, 76, 77, 78, 79 and 80 separated by inner and outer spacers 82, 82′, 83, 83′, 84, 84′, 85, 85′, 86, 86′, 87, 87′, 88, 88′, and flow restrictors 150, 151, 152, 153, 154, 155 and 156. As may be seen more clearly in FIG. 5 the upper member 64 engages the upper surface of spacers 82 and 82a and the lower member 65 engages the lower surface of spacer 88′ and 88′a.

The guide vanes 75 to 80 extend from one side of the members 64 and 65 to the other sides thereof and have arcuate end portions 90 as may be seen more clearly in FIG. 2. The spacers 82 to 88′ and 82a to 88′a sandwich the flow restrictors 150 to 156 and 150a to 156a respectively. Thus, the thickness of the spacer-flow restrictor assembly determines the channel thickness, $h$, i.e. the distance between guide vanes 75 to 80. The distance between inner and outer spacers determines the channel width, $b$. Suitable fasteners 95 are provided extending through the spacers, flow restrictors and vanes as well as members 64 and 65 to rigidly fix the channel defining members together as a unit within housing 14.

Figure 3:
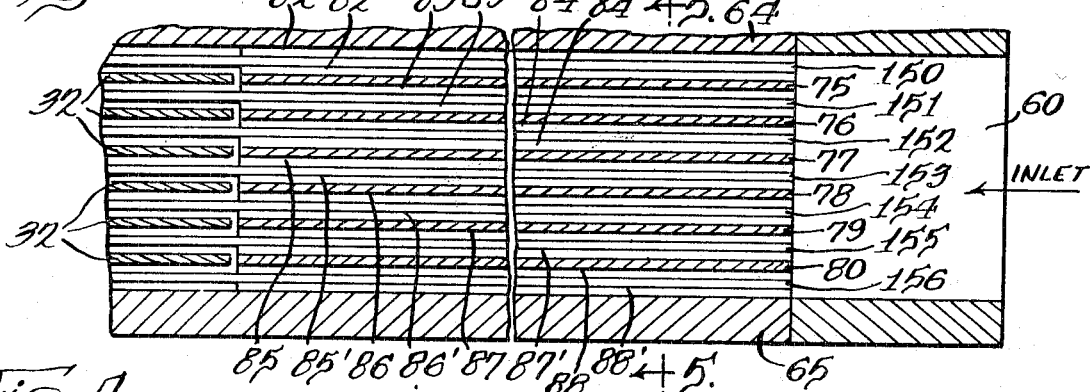
FIG. 3 is an enlarged fragmentary view taken generally along line 3—3 of FIG. 2 showing the inlet flow straightener for the flow meter.

It should be understood that the guide vanes and spacers as shown in FIG. 3 terminate at the ends of the discs 32 while the flow restrictors extend between the discs 32 and through first pass outlet section 96 to end plate 31. Since the flow restrictors must extend between the discs 32 they must have a thickness less than the distance $h$ between the discs.

The inlet guide vanes 75 to 80 define a plurality of inlet channels 98 between members 64 and 65 for the purpose of straightening the fluid flow prior to entry between the discs 32. The flow restrictors 150 to 156 which are sandwiched between the inner and outer spacers 82 to 88 and which extend the length of the flow channel passing between the discs 32 are used for the purpose of reducing the transverse flow that might occur as the gas or fluid passes the disc or metering section of the channel.

To assure that Equation 17 or 18 finds validity in the meter illustrated, the velocity distribution should be as fully developed as possible when the gas initially wets the surface area of the discs 32. The axial or $z$ length of the inlet vanes 75 to 80 is sufficient to effect this development prior to entry between the discs. In some cases it might be desirable to provide a short exit length of guide vanes in outlet section 96 to assist in maintaining the velocity distribution across the entire length of the discs although this may not be essential, and as will appear hereinbelow, no such exit vanes are provided in the embodiment illustrated.

It is well known, that for a rectangular channel the length required to hydro-dynamically develop the velocity profile is proportional to the equivalent diameter $De$ and the Reynolds number formed by the equivalent diameter. That is:

(19) $$z_f d \simeq DeRe$$

Using the proportionality constant found in the experiments of E. M. Sparrow et al., for a channel having an aspect ratio ($b/h$) of 5:1, a conservative estimate of the length of the inlet vanes 75 to 80 for aspect ratios greater than 5:1 is obtained from the equation

(20) $$z_f d = 0.08\ DeRe$$

where: $z_f d$ is defined as the length of the vanes desirable to approach very nearly the Poiseuille parabola at the inlets of the discs 32.

Figure 4:
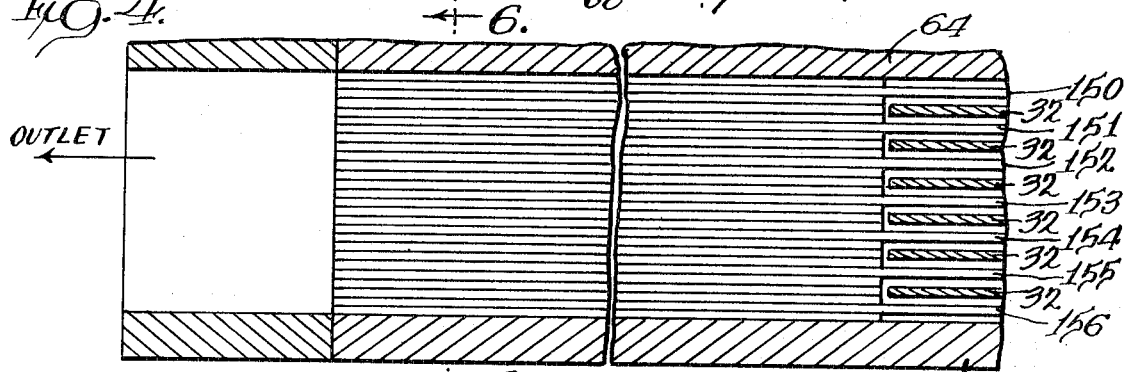
FIG. 4 is an enlarged fragmentary view taken generally along line 4—4 of FIG. 2 showing the first pass outlet for the present flow meter.
Figure 5:
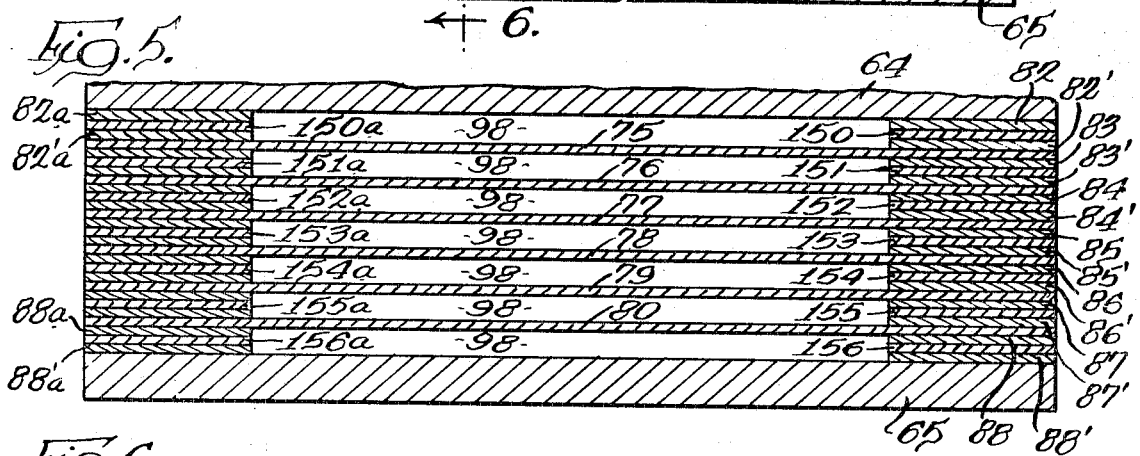
FIG. 5 is an enlarged fragmentary section taken generally along line 5—5 of FIG. 3 showing the inlet channel.
Figure 6:
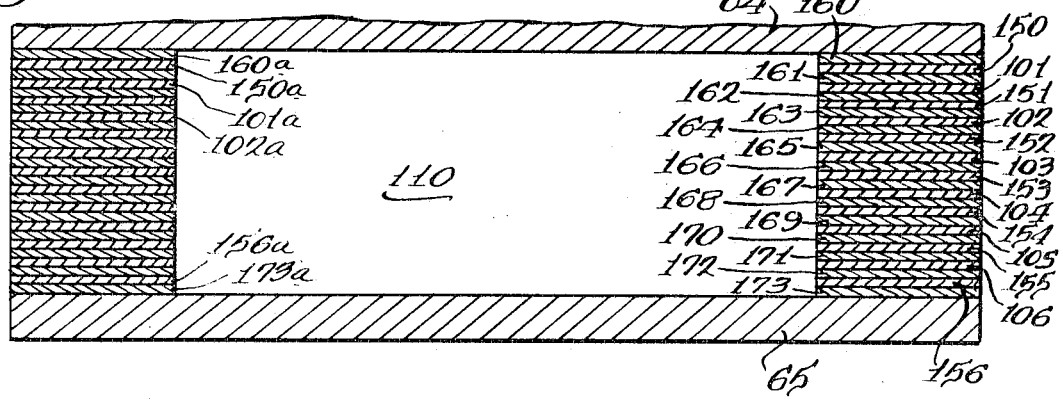
FIG. 6 is an enlarged fragmentary view taken generally along line 6—6 of FIG. 4 showing the first pass outlet channel.

The outlet section 96 of the flow channel is also defined by the members 64 and 65 as shown in FIGS. 4 and 6. However, the inlet guide vanes or flow straighteners are replaced by spacers 101 to 106 and 101a to 106a which are the same thickness as the inlet guide vanes so that members 64 and 65 are spaced the same distance apart in the outlet section. Inner and outer spacers 160 to 173 are provided sandwiching the flow restrictors 150 to 156. Since in the outlet section the spacers are all of equal width as seen in FIG. 6 there is defined between members 64 and 65 an open unobstructed outlet conduit 110. Outlet conduit 110 communicates with a suitable opening 112 (FIG. 2) in end plate 31. In a single pass construction the flow would exit the meter at opening 112 where there would be attached a suitable output coupling.

Fixed to the outside of end plate 31 is a flow turning assembly 115 having formed therein an enclosed U-shaped rectangular channel 116 communicating at one end with opening 112 and at the other end with a complementary opening 118 in end plate 31.

Opening 118 defines an inlet for the second pass channel which includes an inlet section 120 and an outlet section 121 substantially identical in construction to the inlet section 62 and the outlet section 96, respectively. Outlet section 121 communicates with an outlet opening 123 in end plate 30 which is adapted to be connected to a fluid consuming system.

Referring to FIG. 1 the magnetic retarding assembly 16 is seen to include a circular aluminum retarding disc 128 fixed to a boss 129 carried by shaft 29. Supported at diametrically opposed locations with respect to disc 128 are magnet assemblies 130 and 131 respectively fixed to supports 132 and 133 mounted by suitable fastening means on housing member 28. The magnet assemblies 130 and 131 are permanent magnets arranged to produce eddy current damping forces on the disc 128 and hence the main disc assembly 10. This force is designated $F_d$ in FIG. 7. It acts at a distance $r$ from the centerline of the disc assembly. Damping magnet assemblies are, per se, known in the instrumentation field so that a detailed explanation and description thereof are not believed necessary, except it is important to note that they produce a damping force $F_d$ proportional to the angular velocity $\omega$ of the disc assembly 10 and that a reasonable temperature compensation can be applied to $F_d$ by the use of flux shunts which are temperature dependent.

It might be helpful at this point to view the dynamic torque balance equation which describes the motion of the drag discs in finite difference form as follows:

(21) $$\frac{T_D(1-\beta) - T_d}{I} \Delta t = \Delta \omega$$

where:

$T_D$ is the driving torque, which is a linear function of the volume flow, $T_d$ is the damping torque, which is a linear function of the angular velocity, $\beta$ represents the fraction of the driving torque which is used to overcome resistance in the bearing system, $I$ is the mass moment of inertia of the disc assembly, and $\Delta \omega$ is the change in velocity over a time interval $\Delta t$.

For counting the rotations of the disc assembly 10 and hence indicating the total volume flow of gas into inlet 60, the counting mechanism 20 is provided, as shown in FIG. 1. This counting mechanism is driven by a gear train 142 driven by shaft 29. Counter 20 positions a dial mechanism 141 of conventional form so that an observer may read out the total volume of gas passed through the meter by viewing the dial through a "Plexiglas" cover 146 fixed to housing member 14 and covering the counting mechanism 20 and dial 141. Since devices of a suitable character for counting the revolutions of shaft 29 are well known to those skilled in this art as well as other arts, a detailed description thereof is not believed necessary.

While the operation of the present flow meter is believed obvious from the above description, it will be summarized as follows. The fluid to be measured enters inlet 60 and passes through inlet section 62 where the Poiseuille velocity distribtuion is developed in each of the channels 98. Since each of the channels 98 is aligned with a corresponding channel between the discs 32, the Poiseuille velocity distribution will be maintained as the fluid enters the channels between the discs. Fluid flowing in the channels between the discs creates the viscous drag force $F_D$, on the disc surfaces in the manner defined above driving the disc assembly 10 and shaft 29 in rotation. Fluid from between the first pass disc channels passes through outlet section 96 and into the second pass inlet section 120, and from there again passes over the discs 32 in the same manner as in the first pass and substantially balancing the driving torque exerted by the fluid on the discs in the first pass section. The fluid from the discs flows into outlet section 121 and passes from the meter through outlet opening 123. The rotations of the disc assembly 10 are counted by counter 20 and indicated by dial 141 thereby providing a representation of the total gas, or other fluid, flow through the meter.

The device as described above may be pressure and temperature compensated so that it may then be calibrated in basic mass flow units. Equation 18 must be satisfied, however, for this calibration. Toward this end a pressure and temperature compensating assembly 174 as shown in FIG. 9, may be provided. The pressure compensation is effected by applying it to the moment arm, $r$, in the damping torque equation $T_d = F_d r$. Temperature compensation is effected by applying it to the damping force $F_d$ in the same equation.

As may be seen in FIG. 9, a damping disc 175 rotates within permanent damping magnets 176. A carrier 177 for the magnets is slidable with fixed guides 178 and 179. The carrier 177 has fixed thereto a piston member 180 slidable between the guides 178 and 179 and biased outwardly by hermetically sealed bellows 181, charged with a reference pressure, $Pr$.

Supply presusre, $Ps$, is applied to one side of the piston 180 opposite the force of the reference pressure bias. As the supply pressure increases, the effective moment arm of the permanent magnet decreases, thereby decreasing the damping torque as fluid density increases.

Temperature compensation is provided by a temperature compensating shunt 182 which varies the permeability of the magnet assembly as a function of temperature.

What is claimed is:

1. A fluid flow device, comprising: at least two interconnected rotary members adapted to be driven by fluid, said rotary members each having at least one substantially flat fluid contacting surface, and means for directing fluid against said surfaces, said fluid directing means being located with respect to said surfaces so that the driving torque on the rotary members is primarily due to the fluid viscosity drag on the surfaces, said means for directing including means for directing the same fluid across the rotary members at least twice.

2. A fluid flow device, comprising: a rotatably mounted member, said member having surfaces adapted to receive fluid, means for directing fluid against said surfaces to cause rotation of said member, said surfaces being shaped and located with respect to said fluid directing means so that the rotation of said member is substantially a linear function of fluid flow from said fluid directing means, said means for directing including means for directing the same fluid across the rotary members at least twice.

3. A fluid flow measuring device, comprising: a first substantially flat rotary disc, a second substantially flat rotary disc, means interconnecting said discs for rotation about a common axis, means defining a flow channel between said discs, said flow channel being defined by spaced flow guiding members between said discs, means for directing fluid into said flow channel to drive said discs, and means for sensing rotation of said discs.

4. A fluid flow measuring device as defined in claim 3, wherein said flow channel is sufficiently narrow so that Poiseuille flow is produced in the channel whereby the rotations of said discs are proportional to the flow in said channel.

5. A fluid flow device comprising: a rotatably mounted member, said member having more than two surfaces adapted to receive fluid, means for directing fluid against said surfaces to cause rotation of said member, said surfaces being shaped and located with respect to said fluid directing means so that the rotation of said member is substantially a linear function of fluid flow from said fluid directing means, said rotatably mounted member including a plurality of substantially flat circular discs mounted for rotation together, means defining a plurality of substantially straight flow channels across said discs, and means defining a plurality of straight inlet channels stationary with respect to said flow channels, said inlet channels corresponding in number to and aligned with said flow channels.

6. A fluid flow device as defined in claim 5 wherein said inlet channels are defined by a plurality of flat inlet vanes each aligned with one of said discs, said inlet vanes being of sufficient length to develop a parabolic velocity profile in said inlet channels.

7. A fluid flow device as defined in claim 6 wherein said discs are spaced sufficiently close so that fluid moving between the discs in the flow channels is in an all boundary layer condition so that viscous stresses influence the entire flow.

8. A fluid flow device as defined in claim 6 wherein said inlet vanes each have an arcuate end portion closely adjacent the associated disc.

9. A fluid flow device as defined in claim 6 including means for counting the rotations of the disc.

10. A fluid flow device as defined in claim 6 and further including a damping disc connected with said other discs for reducing the rotational velocity of said discs.

11. A fluid flow device as defined in claim 10 wherein said discs define part of a damping assembly, pressure and temperature compensation means in said damping assembly so that the flow device may be calibrated in mass flow units.

12. A fluid flow device as defined in claim 10 wherein said damping disc defines part of a damping assembly, pressure compensation means for said damping assembly including means for varying the moment arm of a damping force applied by the damping assembly as a function of fluid pressure.

13. A fluid flow device comprising: a rotatably mounted member, said member having more than two surfaces adapted to receive fluid, means for directing fluid against said surfaces to cause rotation of said member, said surfaces being shaped and located with respect to said fluid directing means so that the rotation of said member is substantially a linear function of fluid flow from said fluid directing means, said rotary member including a plurality of flat annular discs connected for rotation together about a common axis, said means for directing fluid including a first plurality of inlet channels for directing fluid across the discs on one side of said axis, a second plurality of inlet channels for directing fluid across the discs on the other side of said axis, and means for delivering fluid to said first and second inlet channels.

14. A fluid flow device as defined in claim 13 wherein said means for delivering fluid to said first and second inlet channels includes means for delivering fluid from said one side of said disc and delivering the same to said second inlet channels.

15. A fluid flow device as defined in claim 6 including housing means for said discs, said discs being mounted for rotation in said housing means about a generally vertical axis, and a magnetic bearing supporting said discs to minimize the resistance to rotation of said discs.

16. A fluid flow device as defined in claim 15 wherein said discs are sufficiently close together so that Poiseuille flow is produced in said flow channels, and means for counting the rotations of said discs to measure the flow through said flow channels.

References Cited

UNITED STATES PATENTS 3,329,021   7/1967   Quesinberry et al.   73—229

FOREIGN PATENTS 873,976   7/1942   France   73—60

RICHARD C. QUEISSER, Primary Examiner

J. K. LUNSFORD, Assistant Examiner